Jan. 1, 1929.
C. A. MARTIN
1,697,432
CONTROL SYSTEM
Filed Aug. 6, 1925
4 Sheets-Sheet 1
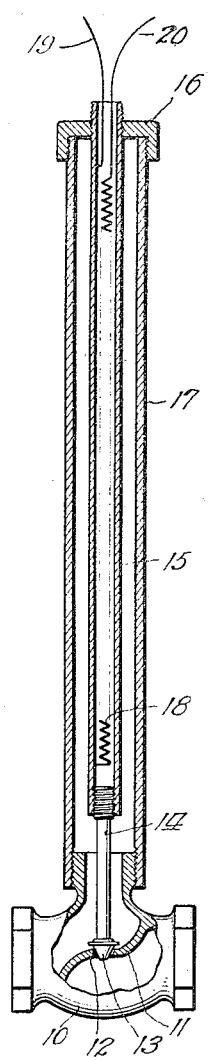
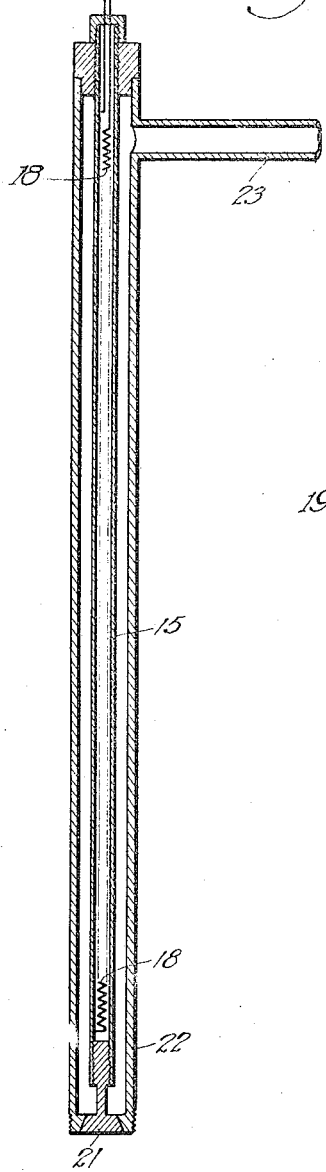
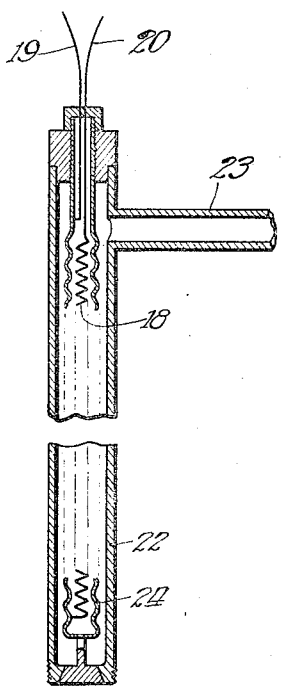
Inventor.
Charles C. Martin.
by May H. Freed Atty.

Jan. 1, 1929.  C. A. MARTIN  1,697,432
CONTROL SYSTEM
Filed Aug. 6, 1925   4 Sheets-Sheet 2
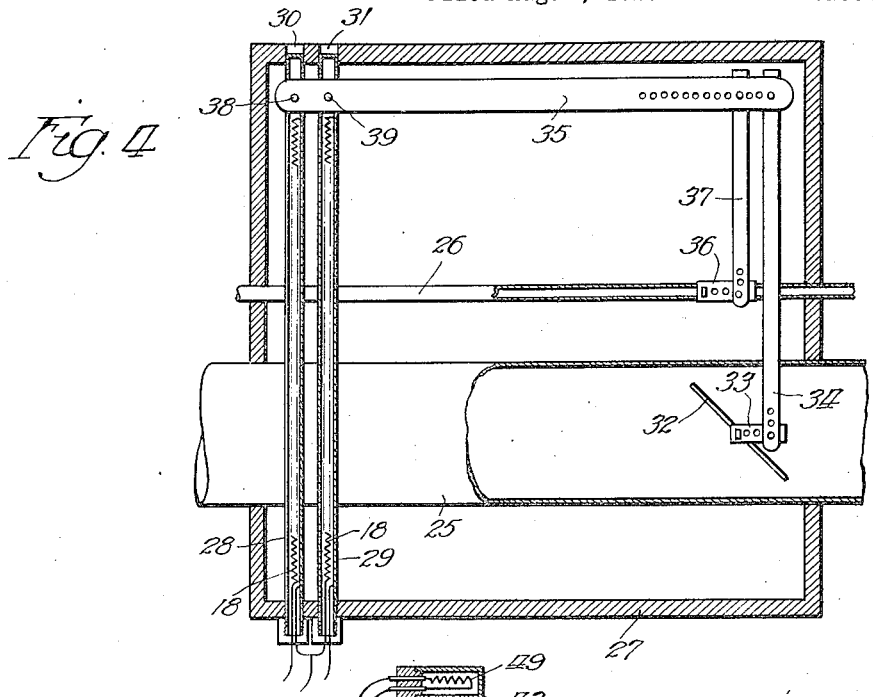
Fig. 4
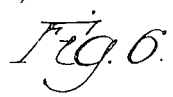
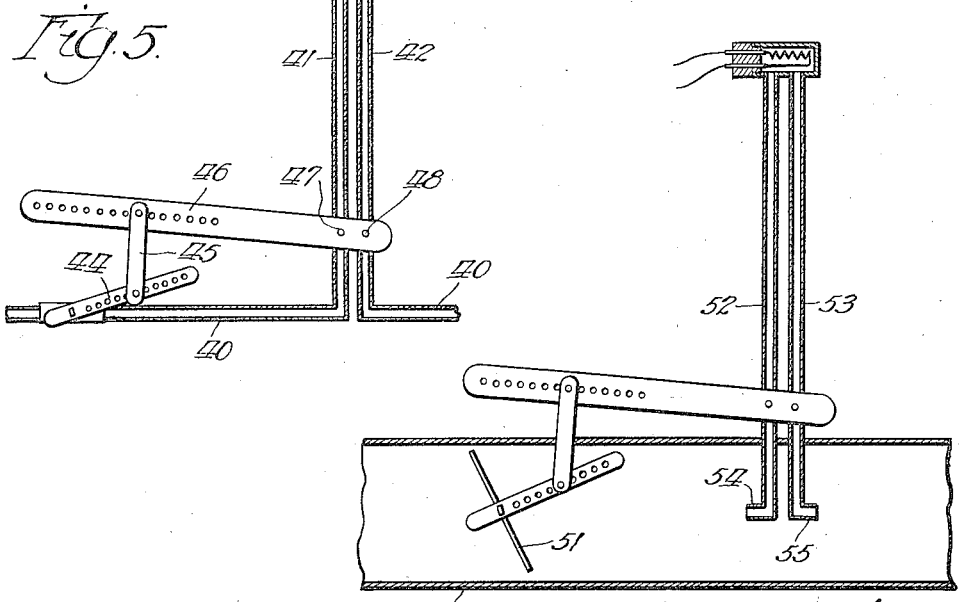
Fig. 5.   Fig. 6.
Inventor.
Charles A. Martin
by Max W. Zabel
Atty.

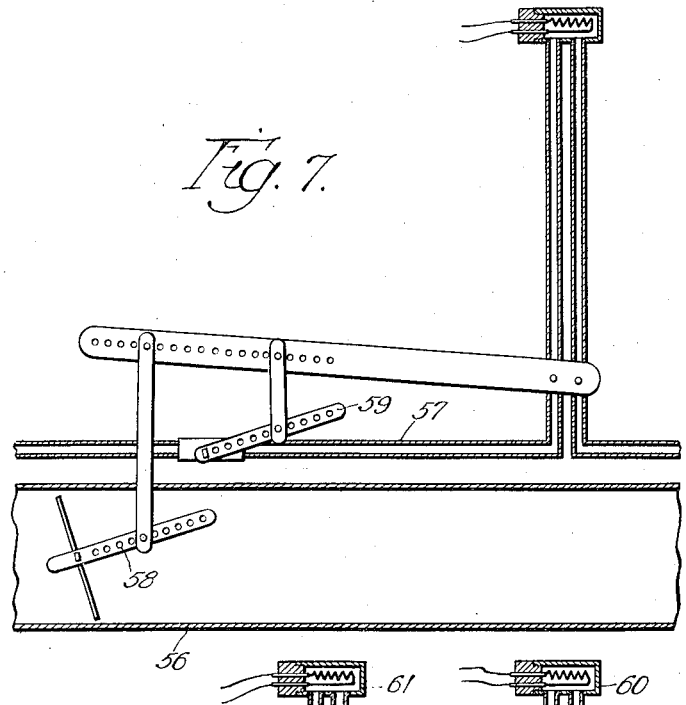
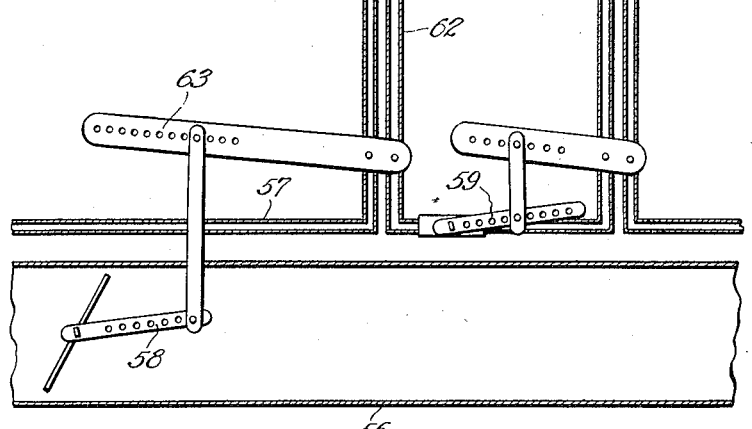

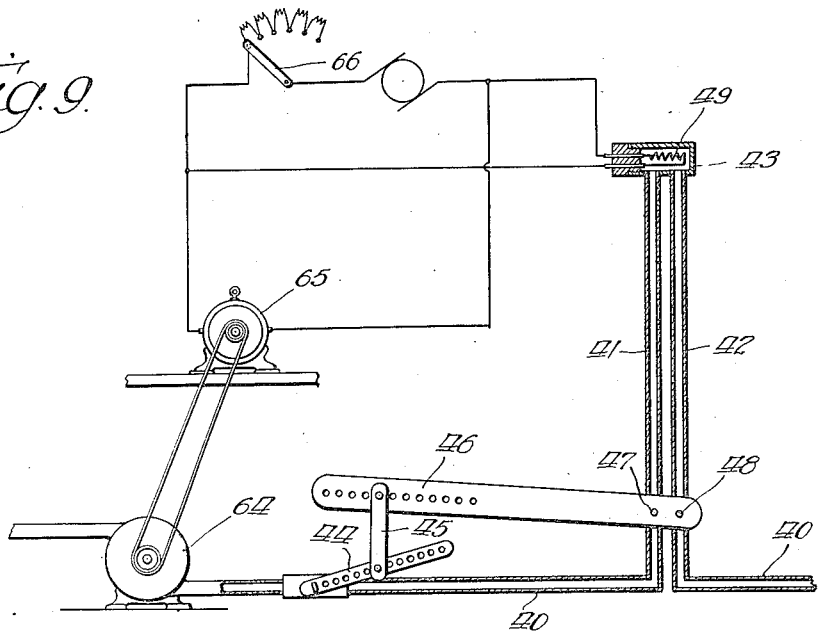
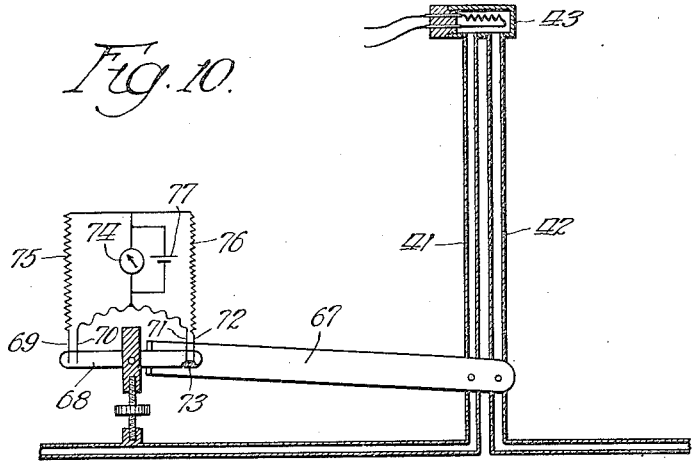

Patented Jan. 1, 1929.

1,697,432

UNITED STATES PATENT OFFICE.

CHARLES A. MARTIN, OF CHICAGO, ILLINOIS.

CONTROL SYSTEM.

Application filed August 6, 1925. Serial No. 48,592.

My invention relates to control systems, and more particularly to systems of this character in which the flow of fluid is suitably controlled.

My invention contemplates means for automatically controlling the flow of any fluid through a pipe, and in addition contemplates means whereby the fluid may be suitably heated.

My invention further contemplates means whereby the flow of two unlike fluids may be so controlled that a suitable ratio is maintained when these fluids are brought together into a mixture, which mixture may be of any form, that is, chemical or physical.

My invention further contemplates means whereby inequalities in the flow or loss of uniformity of flow may be compensated for so as to automatically bring about such changes as will again secure the uniformity of flow.

Various other features of my invention will be apparent from the various embodiments thereof which I will now describe in connection with the accompanying drawings, in which,—

Fig. 1 is a side view, partly in section, of a valve constructed in accordance with my invention;

Fig. 2 is a view similar to Fig. 1, showing in addition means for heating the fluid;

Fig. 3 is a side view, partially in section, of a different form of structure for performing the functions of the structure of Fig. 2;

Fig. 4 is a side view, partly in section, of a double valve structure;

Fig. 5 is a fragmentary view of a modified form of valve-controlling structure;

Figs. 6, 7 and 8 are also different forms of valve-controlling structures;

Fig. 9 shows my improved valve-controlling structure in connection with means for controlling the source of supply; and Fig. 10 shows my improved valve-controlling means in connection with indicating means.

Referring more particularly to Fig. 1, I show a valve casing 10 having a suitable web 11 whose port 12 is controlled by a valve 13. This valve is mounted upon a suitable stem 14 mounted upon the extremity of an expansible tube 15. This expansible tube, at its opposite extremity, is fastened into the cap 16, closing the extremity of the tube 17 fastened to the valve casing 10. A suitable heating element 18 is mounted within the tube 15, this heating element having terminals 19 and 20 which can be suitably supplied with current as may be required. Whenever the element 18 is heated, the tube 15 expands and closes the valve 13. It will be seen from this arrangement that the degree of opening or closing of the valve 13 is dependent upon the amount of heating due to the heating element 18.

Referring now to Fig. 2, I show a valve 21 which controls the opening at the extremity of the tube 22, which tube, at its opposite extremity, has an outlet pipe 23. A heating element 18 is provided for heating a tube 15, similar to the structure disclosed in Fig. 1. In this particular form, however (Fig. 2), the fluid which is to be controlled by the valve 21 passes into the tube 22 upon the opening of the valve 21, and is then caused to flow throughout the length of this tube 22 in close contact with the heated tube 15, so that the fluid, in addition to being controlled quantitatively, is also thermally controlled.

It follows from this that if a given current flows through coil 18 and the velocity of flow of the fluid increases for any given reason such as a change in pressure, that this more rapid flow will more rapidly conduct heat away from the tube 15 to thereby cool it and decrease the opening of the valve. In other words, a change in the rate of flow causes a change in the position of the valve. In connection with Fig. 5 and other figures to be presently explained, the effect due to the changes in the initial temperature of the fluid are compensated for by regulating the valve due to differences in temperature of the fluid before and after heating.

In Fig. 3, I show a similar structure, with the modification, however, that the tube 15 of Fig. 2 is displaced by a corrugated tube 24 in order to obtain greater expansion effects.

In Fig. 4, I show a form in which my improved valve structure may be employed. In this particular figure I show a duct 25, which may be an air duct, and I show a pipe 26, which may, for instance, be an oil or gasoline duct. My improved apparatus is carried by a box-like structure 27. In this structure I mount two expansible tubes 28 and 29, respectively, each having their separate heating elements 18, the tubes 28 and 29, respectively, terminating in openings 30 and 31, in which openings they are slidable. The duct 25 has a control valve 32, which is pivotally mounted, and may be swung by means of the lever 33. This lever 33 is adjustably united to a link 34, which link in turn is adjustably united to another link 35. The pipe 26 also has a valve similar to the valve 32, but which is not shown, which valve is movable by means of the lever 36, which lever is adjustably connected with the link 37, said link 37 in turn being adjustably connected with the link 35. If it is now desired to control the position of the valves in the duct 25 and pipe 26, then the heating elements in the tubes 28 and 29 are heated. If, for instance, the tube 28 is not heated, whereas the tube 29 is heated, then the link 35 is swung contra-clockwise, thus to effect a greater opening of the two valves. This link 35 is connected to the tubes 28 and 29, respectively, by the pins 38 and 39. Now if it is desired to bring the valves back to their original position, as shown, for instance, in the illustration, then the heating of the element within the tube 29 is discontinued. If then it is desired to further close the valves, tube 29 is not heated, but tube 28 is heated, which will swing the link 35 clockwise, to thereby effect this result. It will be noted that the valves are first set into a normal position through the agency of the adjustable connections between the levers 33 and 36 and the links 34, 35 and 37. Then the valves may by controlled so as to assume either a more closed or a more open position, depending upon the manner and degree of heating of the tubes 28 and 29. The heating of these tubes can, of course, be suitably controlled due to any conditions either at the intake or exhaust of the pipes and ducts carrying the fluids. Any suitable automatic control may be used in order to bring about a desired result.

In Fig. 5, I show a pipe 40 which is adapted to conduct a fluid, which pipe has two upstanding legs 41 and 42, which are at their upper extremities in communication with the interior of a heating chamber 43. A suitable valve controls the flow through the pipe 40 through the agency of the lever 44, which lever, through the agency of the links 45 and 46, is controlled by the relative expansion between the upstanding legs 41 and 42, the link 46 being connected to the elements 41 and 42 through the agency of the pins 47 and 48. Within the heating chamber 43, I provide a heating element 49. In this particular form of the device, it will be noted that the fluid passing up through the leg 41 is as yet in an unheated condition, whereas that same fluid passing down through the leg 42 has been heated. The arrangement is such that whenever the flow of fluid is normal the valve retains its predetermined normal position. Should, however, there be some stoppage of the flow through the tube 40, as might be occasioned by some obstruction at the outlet, then the passage of the fluid through the leg 42 is retarded, and thereupon the fluid remains for a longer period of time in the heating chamber 43, thus heating it to a greater extent, whereupon the more highly heated fluid in the leg 42 causes increased expansion, thus to open the valve controlled by the lever 44. In this way a greater pressure is exerted and the flow of fluid may be restored practically to normal.

In Fig. 6, I show this system of heating applied to the larger duct 50, having the valve 51. In that I utilize two tubes 52 and 53, which project into the duct, one having an intake mouth 54 pointing to the left, and the other a discharge mouth 55 pointing to the right. In this way the flow through the duct controls the valve, but unlike the structure of Fig. 5, only a portion of the fluid is utilized to bring about this result, as only a portion of the fluid passes through the tubes 52 and 53. The velocity of the flow through the duct 50, of course, also controls the amount of fluid passing through the tubes 52 and 53, both by the increased pressure exerted against the intake mouth 54 and the suction which is caused at the discharge mouth 55.

In Fig. 7, I show a further modified form of structure, in which the duct 56 and pipe 57 again conduct fluids, but the valve structures controlled by the links 58 and 59 are both controlled by the conditions of the flow of the fluid through the pipe 57, the control features being the same as illustrated in connection with Fig. 5.

In Fig. 8, the duct 56 and pipe 57 are again controlled somewhat similarly to the control shown in Fig. 7, with this further modification that separate and distinct heating devices are utilized to control the two valves controlled, respectively, by the levers 58 and 59. When the rate of flow through the valve controlled by the lever 59 is changed by increasing or decreasing the supply of heat within the heating chamber 60, a corresponding change in the rate of flow through the heating chamber 61 takes place. As the potential across the terminals of the heating elements within the heating chamber remains practically constant, the heat transmitted to the leg 62 will increase its temperature inversely proportional to the rate of flow through the said tube 62. As the temperature increase of the tube 62 becomes greater when the flow through the said tube becomes less, then the link 63 is moved clockwise, and the valve controlled thereby is moved further toward its closed position. When the flow through the tube 62 increases, which thereupon causes operation of the link 63 downwardly, the valve controlled thereby is opened. The opening of the valve controlled by the lever 58 is therefore proportional to the flow through the tube 62 and the valve controlled by the lever 59. The increase in the opening of the valve controlled by the lever 58, therefore, depends upon the condition of flow through pipe 57.

In Fig. 9, I show a structure similar to that of Fig. 5 with this further addition, that a pump 64 suitably controlled by a variable speed motor 65 is operated in proportion to the degree of heating of the element 49. In other words, as current is supplied to the element 49, current is supplied to the motor 65, and this control may be suitably effected by a switch arm 66 either manually or automatically controlled. The object of using this proportional speed motor 65 in conjunction with the valve is to control the ratio of flow of two or more liquids, vapors or gases. The flow through the valve controlled by the lever 44 is proportional to the watts input in the heating chamber 43, while the flow resulting from the operation of the proportional speed motor is proportional to the watts input in the said motor. The motor may operate a blower, pump, or any other device for forcing the flow of liquid, vapor or gas through one or more valves in addition.

In Fig. 10, I show a control structure somewhat similar to that shown in Fig. 9, but I utilize the relative expansion difference to control a lever 67, which lever is adapted to tilt a tube 68 having two sets of terminals therein, respectively, the terminals 69, 70, and the terminals 71, 72. A drop of mercury 73 is adapted to close the circuit between either pair of terminals, depending upon the tilt of the tube 68. An indicating device 74, having the two coils 75 and 76, and supplied with current by the battery 77, indicates the tilt of the tube 68, thus to indicate the relative condition of temperature between the legs 41 and 42.

What I claim as my invention is:

1. A device of the character described comprising two valves, each valve controlling a fluid passage, and means controlled by the thermal condition of the fluid in one passage to open and close both valves in unison whereby a definite ratio of flow may be maintained between the fluids in the two passages.

2. A device of the character described comprising a valve, a passageway for conducting a fluid, means associated with said passageway at a given place thereof for heating the fluid passing said means, and expansible and contractible means responsive to the difference in thermal condition of said heated and unheated fluids for controlling said valve.

3. A device of the character described comprising a tube, a valve for controlling the flow of fluid through said tube, heating means at an intermediate portion of said tube for heating the fluid passing said means, and means whereby the expansion and contraction of said tube due to the thermal condition of the fluid therein controls said valve.

4. A device of the character described comprising a valve, a passageway for conducting a fluid, electric means associated with said passageway at a given place thereof for heating the fluid passing said means, and expansible and contractible means responsive to the thermal condition of said heated fluid for controlling said valve.

5. A device of the character described comprising a valve, a passageway for conducting a fluid, electric means associated with said passageway at a given place thereof for heating the fluid passing said means, and expansible and contractible means responsive to the difference in thermal condition of said heated and unheated fluids for controlling said valve.

6. A device of the character described comprising a valve, a passageway for conducting a fluid, the flow of fluid through which is controlled by said valve, electric means associated with said passageway at a given place thereof for heating the fluid passing said means, and expansible and contractible means responsive to the thermal condition of said heated fluid for controlling said valve.

7. A device of the character described comprising a tube, a valve for controlling the flow of fluid through said tube, electric heating means at an intermediate portion of said tube for heating the fluid passing said means, and means whereby the expansion and contraction of said tube due to the thermal condition of the fluid therein controls said valve.

8. A device of the character described comprising a valve, means adapted by expansion and contraction to control the movements of said valve, said means being in contact with fluid passing said means so that said means is responsive to the rate of flow and thermal conductivity of said fluid, and means for heating said fluid while it is passing said expansible and contractible means.

9. A device of the character described comprising a valve, a fluid duct, expansible and contractible means responsive to the thermal characteristics of the fluid in said duct for controlling said valve and electric means for heating said expansible and contractible means.

10. A device of the character described for controlling the rate of flow of fluid thru a conduit, comprising a valve, and expansible and contractible means responsive to the thermal condition of said fluid for operating said valve towards the open position for a decrease in the flow of said fluid and towards the closed position for an increase in the flow of said fluid and means in said conduit for changing the thermal condition of said fluid.

11. A device of the character described for controlling the flow of fluid thru a conduit, comprising a valve and expansible and contractible means responsive to the thermal condition of said fluid for operating said valve towards the open position for a decrease in the flow of said fluid and towards the closed position for an increase in the flow of said fluid and means for heating said fluid.

12. A device of the character described for controlling the flow of fluid thru a conduit, comprising a valve and expansible and contractible means responsive to the thermal condition of said fluid for operating said valve towards the open position for a decrease in the flow of said fluid and towards the closed position for an increase in the flow of said fluid and electric means for heating said fluid.

13. Apparatus of the character described for automatically controlling the quantity of flow of a fluid thru a conduit, comprising a valve, expansible and contractible means responsive to the flow of said fluid for operating said valve towards the open position for a decrease in the flow of said fluid and towards the closed position for an increase in the flow of said fluid and electric means for continuously heating the first aforesaid means.

14. Apparatus for automatically controlling the rate of flow of fluid thru a conduit, comprising means independent of rate of flow of said fluid for heating said fluid and a valve for controlling the rate of flow of said fluid, said valve operated by expansible and contractible means responsive to the joint effect of the rate of flow of said fluid and the quantity of heat applied to said fluid.

15. Apparatus for automatically controlling the rate of flow of a fluid thru a conduit, comprising means independent of the rate of flow of said fluid for heating said fluid, a valve for controlling the flow of said fluid, said valve operated by expansible and contractible means responsive to the rate of flow of said fluid for a predetermined rate of application of heat to said fluid.

16. Apparatus for automatically controlling the rate of flow of a fluid thru a conduit, comprising means independent of the rate of flow of said fluid for applying heat to said fluid, a valve for controlling the flow of said fluid, expansible and contractible means responsive to the thermal conditions of said fluid for operating said valve towards the open position for a decrease in the rate of flow of said fluid and towards the closed position for an increase in the rate of flow of said fluid.

17. Apparatus for automatically controlling the rate of flow of a fluid thru a conduit, comprising electric means independent of the rate of flow of said fluid for applying heat to said fluid, a valve for controlling the flow of said fluid, expansible and contractible means responsive to the thermal conditions of said fluid for operating said valve towards the open position for a decrease in the flow of said fluid and towards the closed position for an increase in the flow of said fluid.

18. Apparatus of the character described for controlling the rate of flow of a fluid thru a conduit, comprising a valve for controlling the flow of said fluid, said valve operated by the difference in expansion between two elements both responsive to the thermal conditions of said fluid and means for continuously maintaining one of said elements at a higher temperature than the other of said elements.

19. Apparatus of the character described for controlling the rate of flow of a fluid thru a conduit, comprising a valve for controlling the flow of said fluid, said valve operated by the difference in expansion between two elements responsive to the thermal conditions of said fluid and electric means for continuously heating one of said elements.

20. Apparatus of the character described for controlling the quantity of flow of fluid thru a conduit, comprising a valve for controlling the flow of said fluid, said valve operated by the difference in expansion between two elements having the same total expansion per unit change in temperature, said elements responsive to the thermal conditions of said fluid and electric means for continuously heating one of said expansion elements.

21. Apparatus of the character described for controlling the quantity of flow of a fluid thru a conduit, comprising a valve for controlling the flow of said fluid, said valve operated by the difference in expansion between two elements having the same coefficient of expansion, said elements responsive to the thermal conditions of said fluid and means for heating said fluid after passing one of said expansion elements to increase its temperature before passing the other of said expansion elements.

22. Apparatus of the character described for controlling the rate of flow of fluid thru a conduit, comprising a valve for controlling the flow of said fluid, said valve operated by the difference in expansion between two elements, one of said elements responsive to the thermal condition of said fluid before heating and the other of said elements responsive to the thermal condition of said fluid after heating and electric means for heating said fluid.

In witness whereof, I hereunto subscribe my name this 27th day of July A. D., 1925.

CHARLES A. MARTIN.